Figure 11:
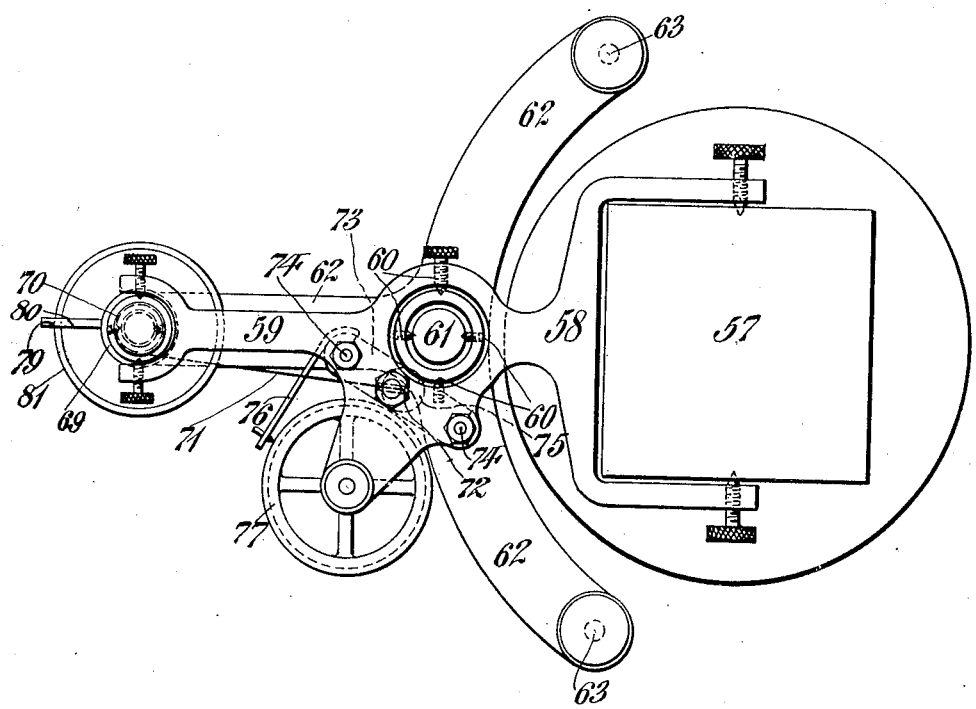

No. 869,716. PATENTED OCT. 29, 1907.
W. H. KENERSON.
EXTENSOMETER.
APPLICATION FILED OCT. 25, 1904.
9 SHEETS—SHEET 1.
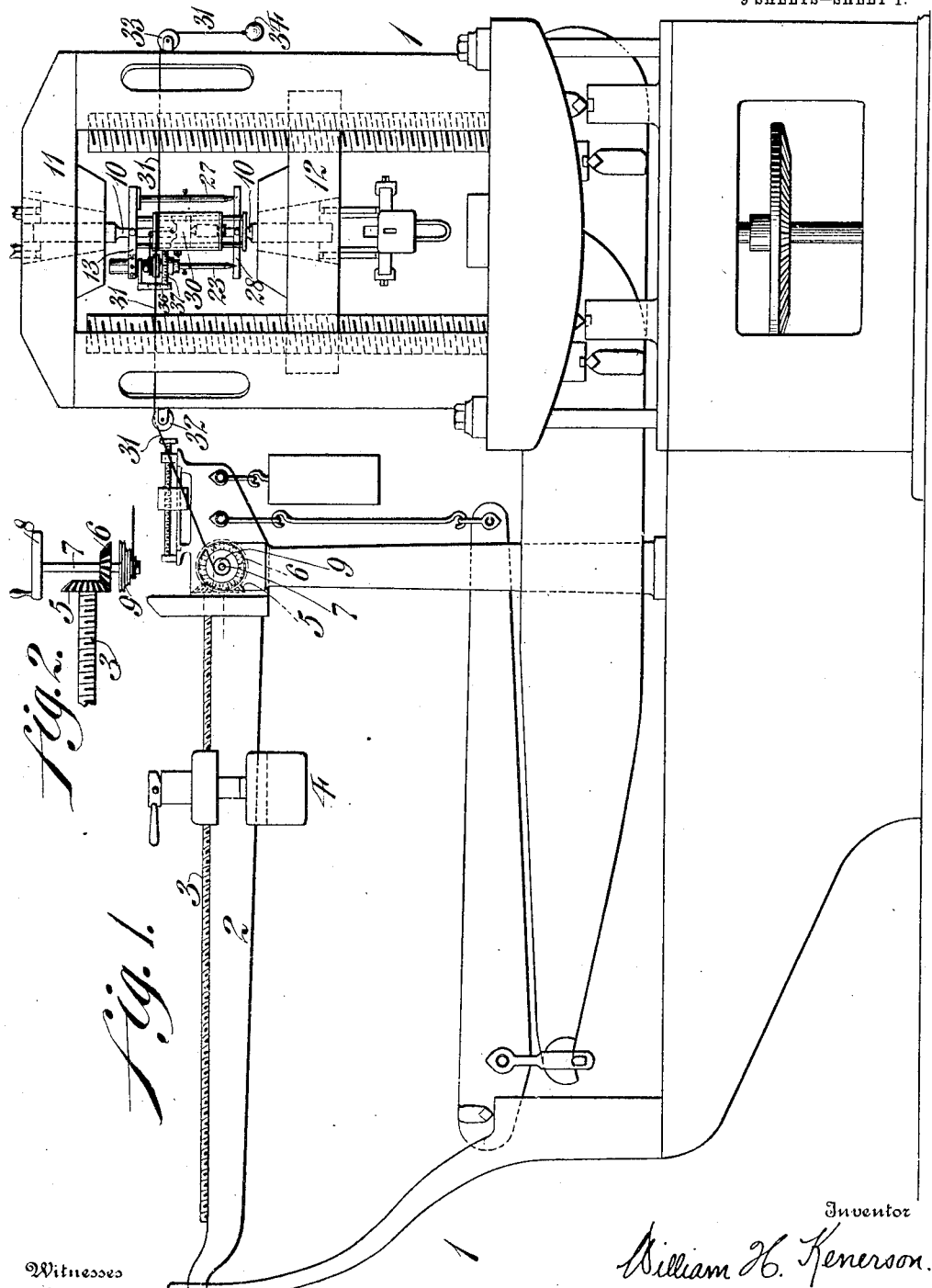
Witnesses
Inventor
William H. Kenerson.
By Diedersheim & Fairbanks
Attorneys

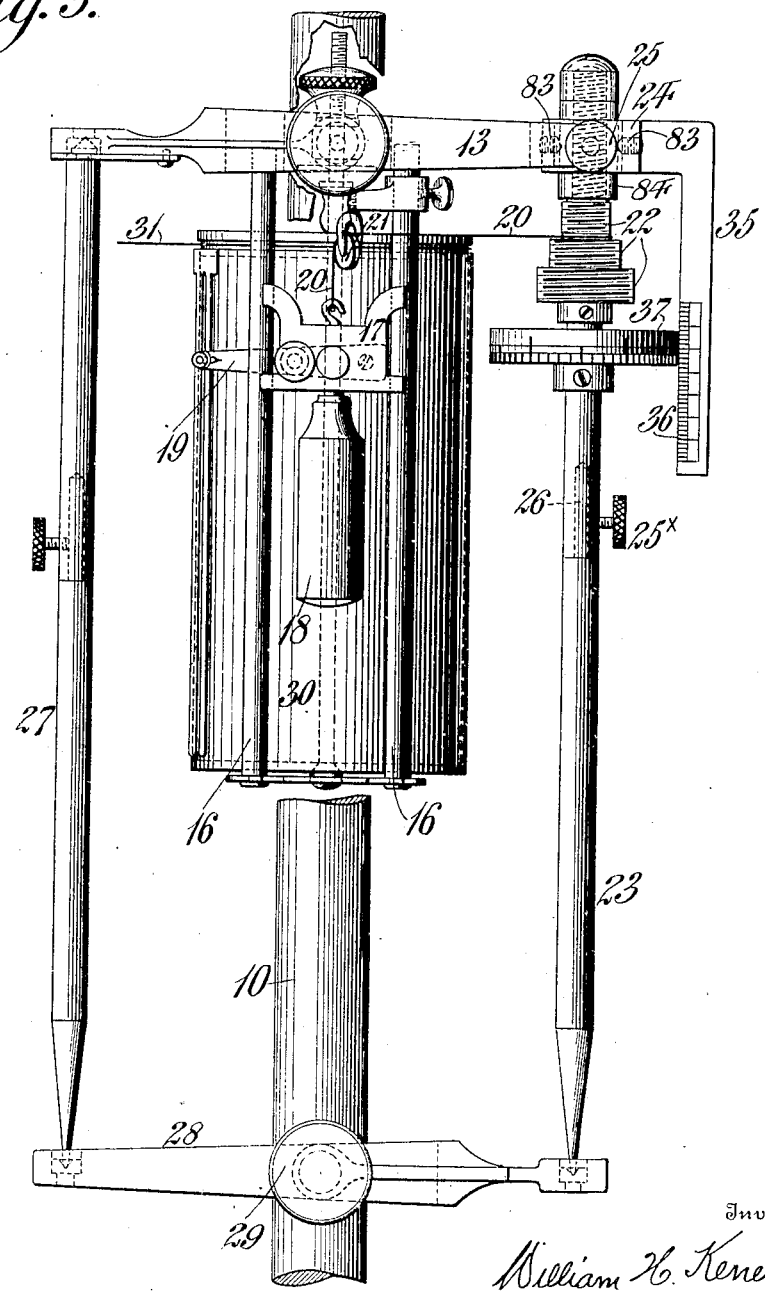

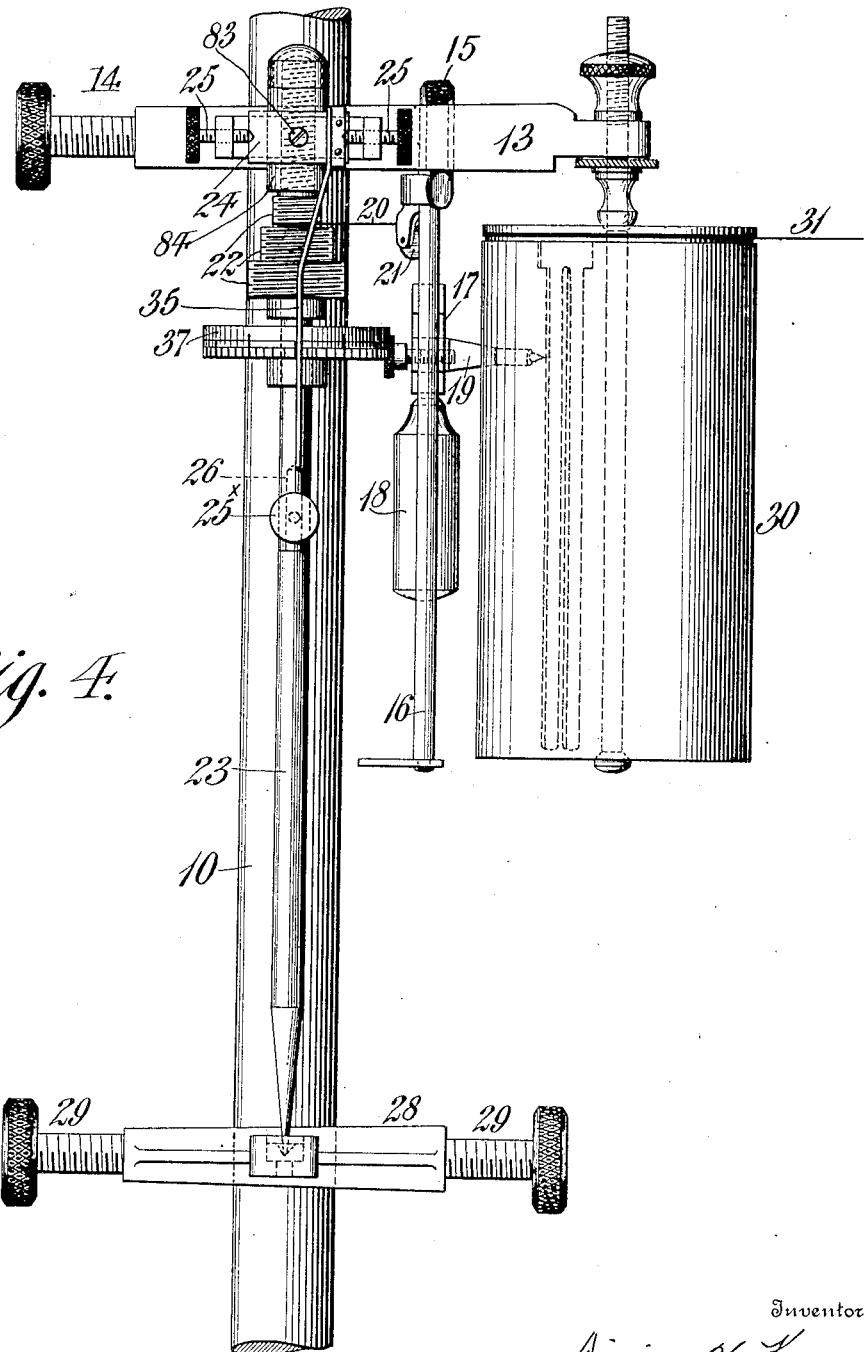

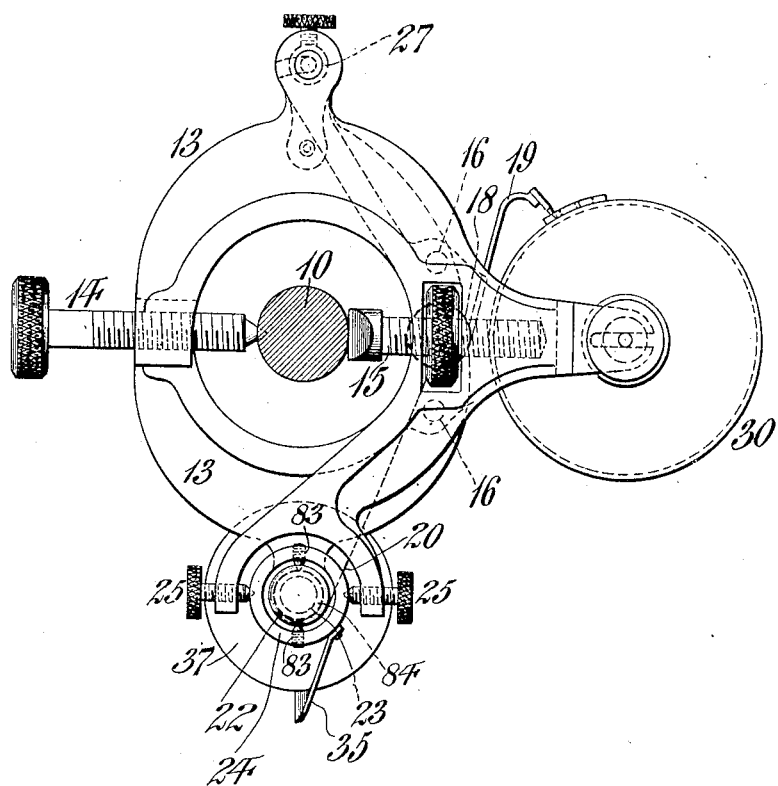

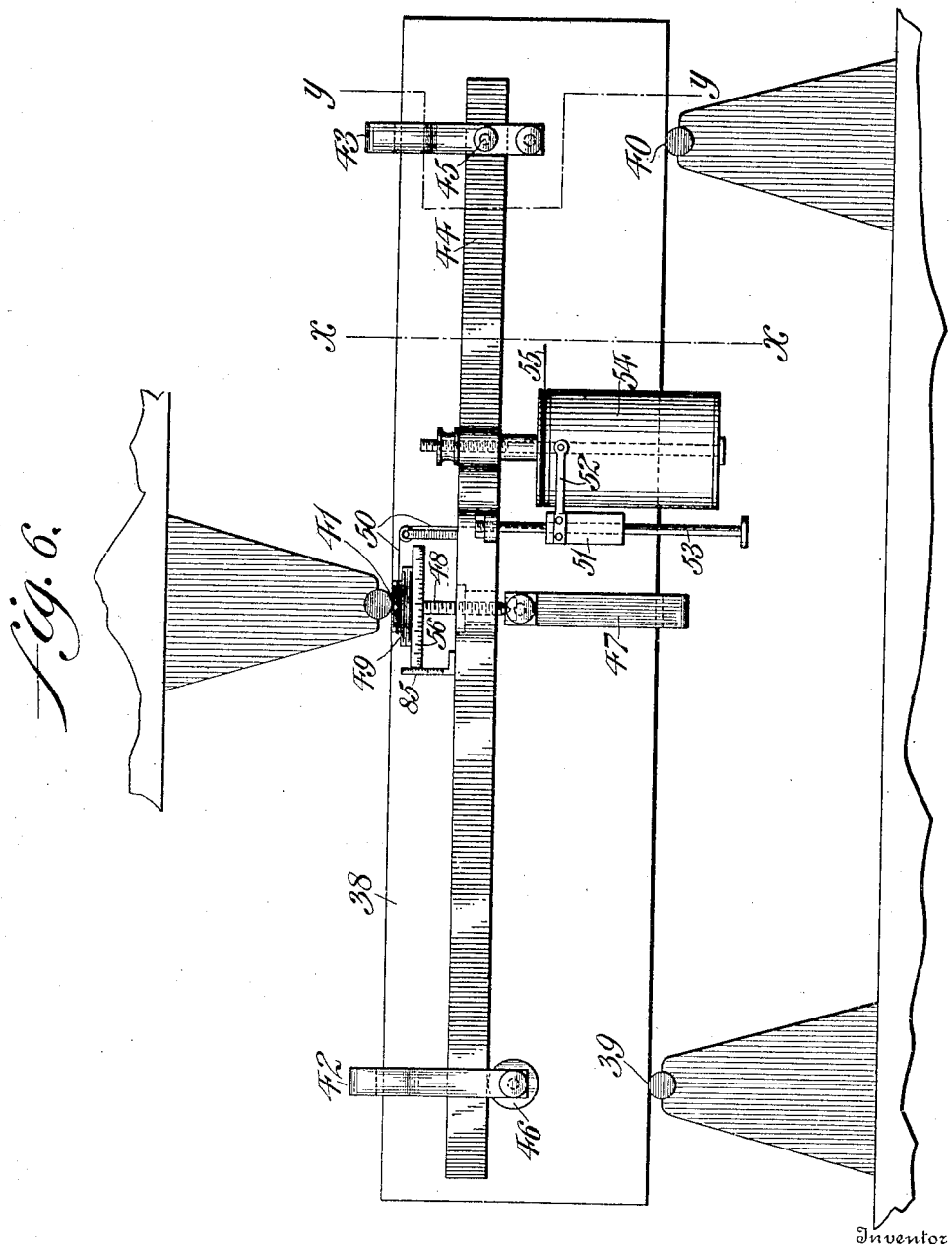

No. 869,716. PATENTED OCT. 29, 1907.
W. H. KENERSON.
EXTENSOMETER.
APPLICATION FILED OCT. 25, 1904.
9 SHEETS—SHEET 6.
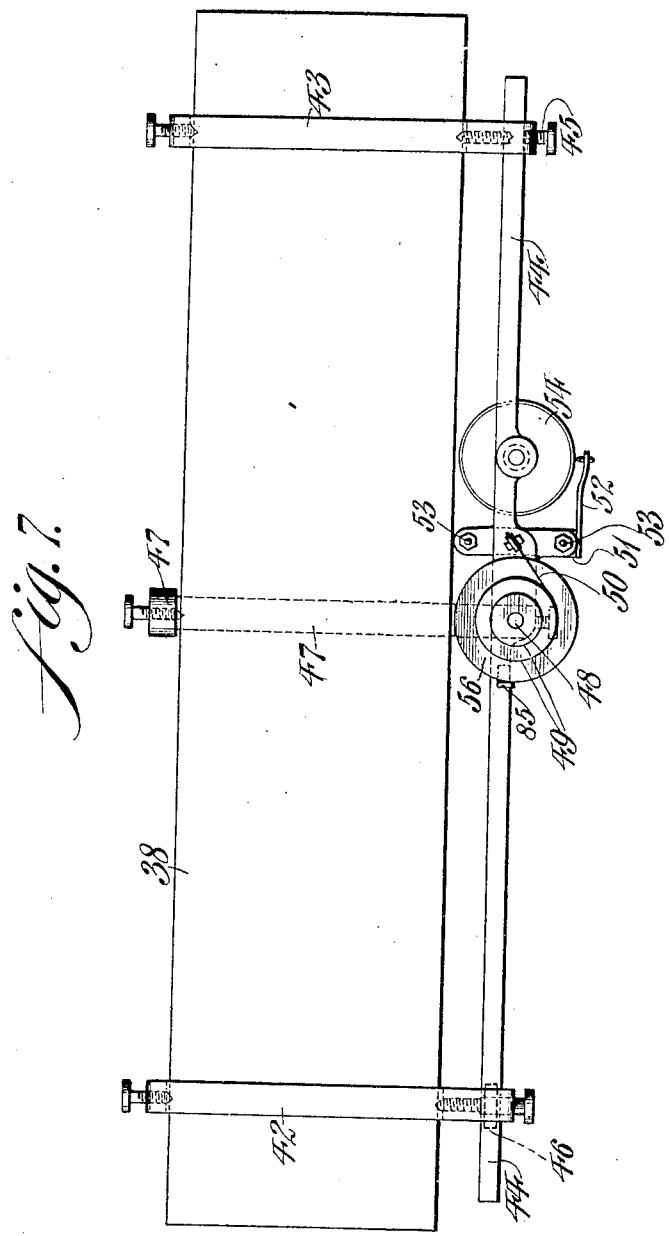

No. 869,716. PATENTED OCT. 29, 1907.
W. H. KENERSON.
EXTENSOMETER.
APPLICATION FILED OCT. 25, 1904.
9 SHEETS—SHEET 7.
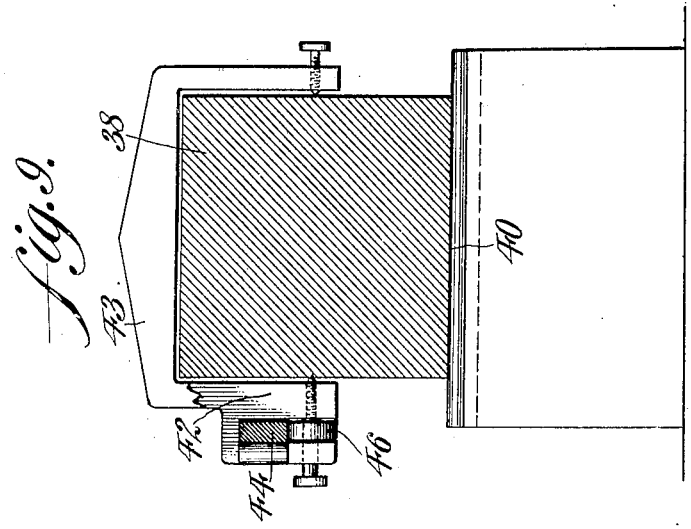
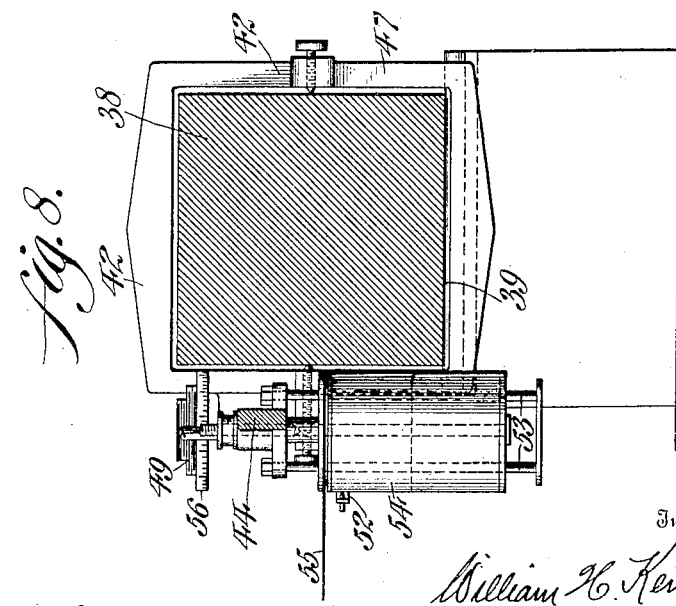

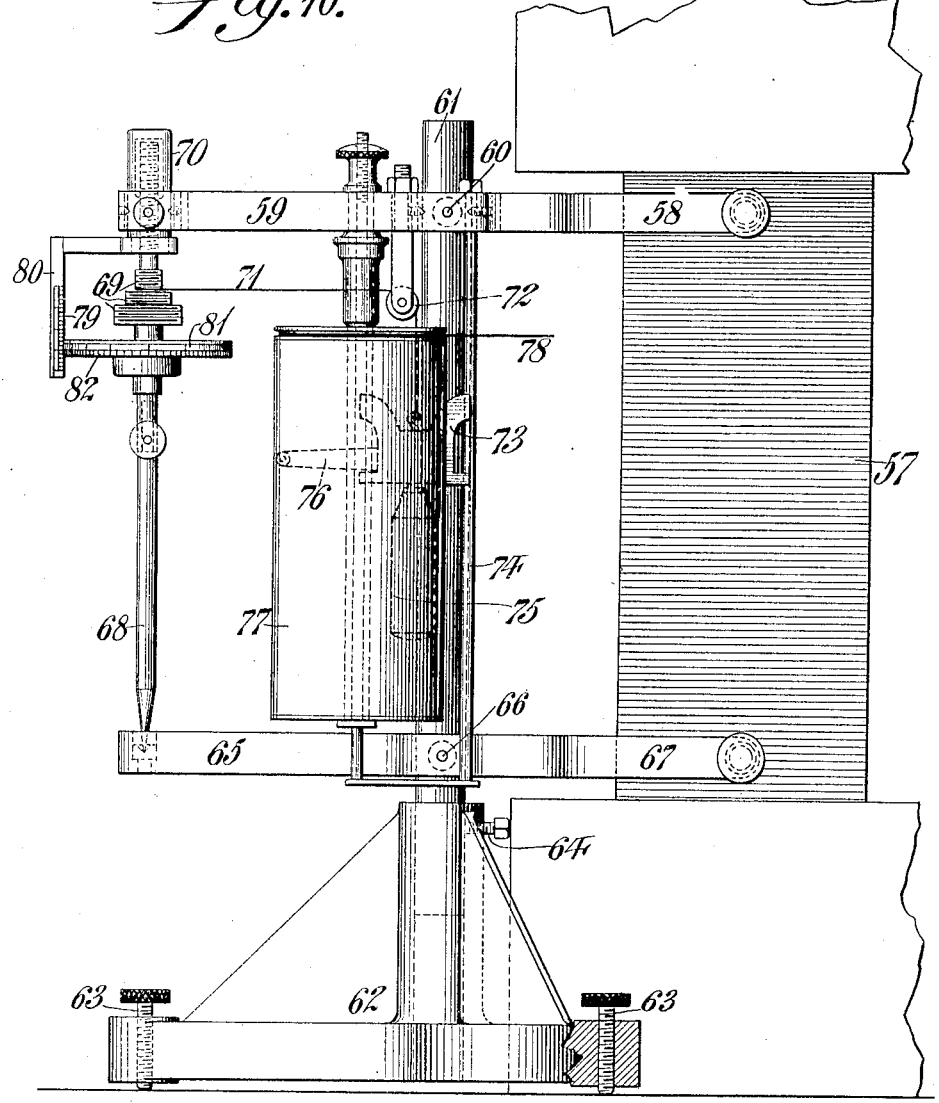

No. 869,716. PATENTED OCT. 29, 1907.
W. H. KENERSON.
EXTENSOMETER.
APPLICATION FILED OCT. 25, 1904.

9 SHEETS—SHEET 9.

UNITED STATES PATENT OFFICE.

WILLIAM H. KENERSON, OF PROVIDENCE, RHODE ISLAND, ASSIGNOR TO RIEHLE BROTHERS TESTING MACHINE COMPANY, A CORPORATION OF PENNSYLVANIA.

EXTENSOMETER.

No. 869,716.    Specification of Letters Patent.    Patented Oct. 29, 1907.

Application filed October 25, 1904. Serial No. 229,981.

*To all whom it may concern:*

Be it known that I, WILLIAM H. KENERSON, a citizen of the United States, residing in the city and county of Providence, State of Rhode Island, have invented a new and useful Extensometer, of which the following is a specification.

My invention consists of an improvement in an extensometer for testing machines, which is arranged to indicate the load placed upon the specimen, and the change in the specimen whereby a diagram is produced.

It further consists of novel details of construction, all as will be hereinafter set forth.

Figure 1 represents a side elevation of a testing machine, showing an extensometer in position thereon. Fig. 2 represents a plan view of a portion of the device, showing the connection between the lead screw and a pulley upon which is wound the cord or cable leading to the extensometer. Figs. 3 and 4 represent front and side elevations respectively, of an extensometer, in detached position and on an enlarged scale. Fig. 5 represents a plan view of the extensometer showing the specimen as sectioned. Fig. 6 represents a side elevation showing the extensometer applied to indicate transverse strains upon a specimen. Fig. 7 represents a plan view thereof. Figs. 8 and 9 represent sectional views on lines $x$—$x$ and $y$—$y$ respectively, Fig. 6. Fig. 10 represents a side elevation showing the extensometer in position for a compression test. Fig. 11 represents a plan view thereof.

Similar numerals of reference indicate corresponding parts in the figures.

Referring to the drawings: 1 designates a testing machine having the usual scale beam 2 which is suitably connected with the lead screw 3 upon which is mounted the poise 4, said lead screw having a gear 5 at one end thereof meshing with the gear 6 which is mounted on the rod 7 which has the hand wheel 8 connected therewith and which carries a pulley 9 which has diameters of various sizes. The testing machine is provided with the usual operative parts and as the same form no part of the present invention, it is not deemed necessary at this time to describe the same, it being of course understood that the specimen 10 is mounted between the upper head 11 and the lower or movable head 12, said specimen being held in said heads by suitable grips.

13 designates a frame which is connected with the specimen at a suitable point thereof, in the present instance it is connected by means of the pointed screw 14 and the knife edge screw 15, so that said frame 13 is carried by the specimen 10 to be tested. Depending from said frame 13 are the rods 16 upon which move and is guided, the carriage plate 17 which has connected therewith or carries a weight 18 and to which plate 17 is attached a pencil or crayon carrier 19, said plate 17 being supported by a cord or wire 20 which passes over the pulley 21 suitably supported and which is connected with and wound around a pulley 22, which is formed of different diameters for purposes to be hereinafter explained. 23 designates a rod upon which said pulley 22 is mounted, said rod being connected with the frame 13 by a universal joint, which in the present instance is formed by the ring 24, being suitably held by the set screws 25 and carried by said ring are screws 83 which support an interiorly threaded nut 84 in which the threaded end of the rod 23 engages, so that the same can turn with respect thereto in order to be raised or lowered, said rod being adjustable in length by means of the set screw $25^\times$ engaging with the end 26 of the lower portion of the rod 23 which enters and is held in a suitable recess in the upper portion of said rod 23.

27 designates a second rod which has a suitable bearing in the frame 13 the lower ends of the rods 23 and 27 having suitable bearings in a second or lower frame 28, which latter is likewise attached to the specimen 10, in the present instance by the screws 29, the end or side of the frame 28, in which the rod 23 is seated, being heavier than the opposite side, for purposes to be hereinafter described.

30 designates a drum which is suitably supported from a portion of the frame 13 and which is in such position with respect to the pencil holder and pencil 19, that the latter bears upon the surface of said drum so that when a suitable paper is placed upon or wrapped around the drum, and the pencil is caused to contact therewith, any movement of the drum or of the pencil, will cause the latter to mark upon the paper on the drum.

31 designates a cord or cable which is connected with and wound upon the pulley 9 upon any one of the diameters thereof and which is wrapped around a suitable portion of the drum 30, passing over the pulleys 32 and 33 and having a weight 34 secured to the end thereof, whereby it will be seen that when the poise 4 is actuated and the lead screw rotated, the pulley 9 is likewise actuated, so as to release or pull on the cord 31, a corresponding rotation being thus imparted to the drum 30, so that the load placed upon the specimen will be indicated by a horizontal line drawn by the pencil on the drum or paper thereon.

As the specimen stretches it will be seen that as the lower frame 28 is carried by said specimen, the latter will carry with it the said frame 28 and as the one side of said frame is heavier than the other, the lighter end will always keep in contact with the end of the rod 27, as a fulcrum, while the heavier end tends to move away from the rod 23. As soon as the latter is unsupported or not in contact with the said frame 28, it will be rotated by the action of the weight 18 on the pulley 22, carried by said rod 23, and as the said rod is in threaded engagement with the nut 84, which is stationary, the rod 23 will be lowered and as the said weight is connected with the carriage 17, which carries the pencil, the same will likewise be lowered and indicate upon the drum or paper thereon the vertical movement of the specimen between the frames 13 and 28 or the stretch of the specimen, so that a complete diagram will be instantly obtained as the test progresses.

If in addition to the diagram it is desired to have a micrometer reading, I have provided upon the frame 13 an arm 35 having a scale 36 thereon, which is arranged with respect to a disk 37 which is carried by the rod 23 and upon the edge of which are provided suitable markings or scale forming a micrometer drum, so that in connection with said scale 36 the vertical movement of the rod 23 and consequently the stretch of the specimen, through its relation with said rod 23 can be accurately read and determined.

It will be noted that the frame 28 is free to move with the screw 29, the pointed ends of which engage with the specimen, while the pointed ends of the rods 23 and 27 bear upon the said frame, so that one, 27, serves as a fulcrum or bearing and the other, 23, is caused to rotate when the frame moves away therefrom.

In order to make the diagram suitable for use, it is preferable to magnify the stretch of the specimen. This is done by placing a fine thread on the end of rod 23. The number of threads for example, being 20. As the distance from the center line of the specimen to a point on the frame 13 over the center of the rod 27 is the same as from the center line of the specimen to a point over the center of the rod 23 and the frames 13 and 28 are fulcrumed at the center of the rod 27, any movement of the specimen which takes place is increased to double the amount at the center line of rod 23. By this means, one revolution of the rod 23, the end of which is threaded twenty threads to an inch, indicates one-fortieth of an inch stretch of the specimen. By means of the pulley 22 this stretch is magnified; as one revolution of the rod 23, equals one-fortieth of an inch movement of the specimen, the cord which is wrapped around the pulley 22 on rod 23 is led off an amount equal to the circumference of the pulley 22. For example, if the circumference of pulley 22 is one inch and one revolution of the pulley takes place, one-fortieth of an inch stretch of the specimen will be indicated by a line one inch long upon the paper on the drum. In the drawings three diameters of the pulley are shown, so that three different magnifications may be obtained, the desired magnification being determined before the device is started and the cord is led around the desired diameter and the pulley is adjusted so that said cord is horizontal. The pulley is formed by turning a thread of the same number per inch as the threaded end of rod 23, so that the cord 20 may always be maintained in position at right angles to that of the specimen.

The parts above described are for use where the tensile strength is desired.

In the construction shown in Figs. 6, 7, 8 and 9, I have shown my extensometer as employed when transverse tests are made. When thus employed I support the extensometer upon the specimen as before, and in the drawings, 38 designates the specimen, which is supported at suitable points 39 and 40, the load being applied as at 41.

42 and 43 designate clamps which are secured to the specimen 38 directly above the points 39 and 40 of the supports, one of said clamps as 43 having one end of a rod or bar 44 suitably attached thereto as by a set screw 45, the other end of said bar 44 passing through a suitable slot in the clamp 42 and resting freely upon a roller 46 carried by said clamp 42.

47 designates another clamp which is secured to the specimen substantially beneath the point 41 at which the load is applied, said clamp having a suitable bearing surface for the rod 48 which is in threaded engagement with the bar 44 and carries the pulleys 49 around which is wound the cord or string 50 which is connected with the weight 51 which carries the pencil holder 52, said weight being suitably guided upon rods 53, which are secured to or carried by the said bar 44.

The drum 54 is suitably attached to the bar 44 and has a suitable cord 55 leading to the pulley 9 which is adapted to be actuated by the rotation of the lead screw 3, before described, so that as the load is applied to the specimen the drum rotates accordingly and the pencil being in contact therewith or with the paper thereon will indicate the load. As the specimen bends from the weight or load applied, it will carry with it the clamp 47, which is thus lowered and removes the support from the threaded rod 48, which is then rotated by the weight 51, the latter thus descending and carries with it the pencil, which indicates therefore, upon the said drum the amount of the bending.

If desired I may provide the rod 48 with the disk 56 having suitable markings or scale forming a micrometer drum, the bar 44 having an arm 85 with a scale thereon, so that a micrometer reading of the amount of bending of the specimen can be read and determined, it being understood that as the specimen bends the bar 44 remains substantially in a horizontal position since one end of the said bar being rigidly secured to the clamp 43, the other end is free to move on the roller 46, the effect of which is evident.

In the construction seen in Figs. 10 and 11, I have shown my device as applied to taking the compression tests in which 57 designates the specimen to which the weight or load is applied in the usual manner, and to which I secure in any convenient manner as by means of the yoke 58, the frame 59 which may be integral with or connected to the said yoke 58, said yoke and frame being pivotally connected as at 60 to a stationary rod 61 which is suitably supported in a frame or stand 62 which is provided with the set screws 63, whereby the device can be readily adjusted in order that the said rod can be leveled or placed in approximately that position, said rod being adjustable with respect to said stand by means of the set screw 64.

65 designates a lower frame which is pivotally connected as at 66 with said stationary rod 61, the opposite end being connected with the specimen 57 by the yoke 67, said frame 65 serving as the support for the rod 68 which carries the pulley 69 and which rod is connected with the frame 59 through the medium of the universal joint previously described, it being understood that as before the said rod 68 is in threaded engagement with the nut 70 which is suitably supported by the frame 59. Passing around the pulley 69 is the cord or cable 71 which passes over the loose pulley 72 and is connected with the frame or carriage 73 guided by the rods 74 which are connected with the frame 59, said carriage having the weight 75 attached thereto and carrying the pencil holder 76.

77 designates the drum suitably mounted with respect to the frame 59 and having the usual cord or connection 78 running to the pulley 9 actuated by the movement of the lead screw 3 before described, it being understood that as the specimen contracts by reason of the load imparted thereto that the yokes 58 and 67 being connected with said specimen 57, are brought or caused to move towards each other and being pivoted at 60 and 66 on the stationary rod 61, the frames 59 and 65 tend to separate so that the rod 68 is not supported by the frame 65, which rod 68 is then rotated by the weight 75 lowering the pencil 76 carried by the weight 75, so that the amount of compression is indicated upon the drum or paper carried thereby while the load or weight applied is indicated as before described by the rotation of the drum caused by the movement of the lead screw 3.

In the construction just described, I can, as explained with reference to the other tests, place a scale 79 on the bar 80, carried by the frame 59, while upon a suitable disk 81 carried by the rod 68 are the markings or scale 82 forming a micrometer drum so that in connection with the said scale 79, the vertical movement of the rod 68 and consequently the compression of the specimen can be read and determined.

The operation of the devices just described will be readily understood from the description already given, it being understood that by the said invention I am enabled to get a diagram of a continuous line which will show the load or stress and the stretch or strain, the stress which has been placed upon the specimen, being indicated by the distance the pencil travels in a horizontal direction, while the strain which the specimen has undergone, being indicated by the distance the pencil travels in a vertical direction, it being understood that by the term "stress" I mean, the load which has been placed upon the specimen, whether in a tensile, a transverse, or a compression test, while by the term "strain" I mean the deformation of the specimen, whether it is stretching, bending or contraction thereof.

It will be evident that various changes may be made by those skilled in the art, which will come within the scope of my invention, and I do not therefore desire to be limited in every instance to the exact construction herein shown and described.

Having thus described my invention, what I claim as new and desire to secure by Letters Patent, is:—

1. In a testing machine provided with a scale beam and movable poise a frame supported by the specimen to be tested, a second frame supported by said specimen beneath said first mentioned frame, a drum carried by said first-mentioned frame and adapted to be actuated by the movement of the poise on the scale beam, a weighted carriage supporting a pencil holder and carried by said first-mentioned frame and an adjustable support therefor affected by the distance between the frames permitting said carriage and pencil holder to be lowered when the distance between said frames varies.

2. In a testing machine provided with a scale beam and movable poise, a frame supported by the specimen to be tested, a rotatable drum movable in correlation with the poise, a rotatable rod in suitable engagement with said frame, means for making rotation of the rod dependent upon change of the specimen, means for rotating said rod and a suitable marker adapted to be actuated by the rotation of the rod.

3. In a testing machine provided with a scale beam and movable poise, a rotatable drum movable in correlation with said poise, a rotatable rod suitably supported with respect to the specimen, means for making rotation of the rod dependent upon change of the specimen, means for rotating said rod, and suitable means actuated by said rod for indicating the rotation.

4. In a testing machine provided with a scale beam and movable poise, a rotatable drum movable in correlation with said poise, a rotatable rod suitably supported with respect to the specimen, means for making rotating of the rod dependent upon change of the specimen, means for rotating said rod, indicating the rotation and magnifying on the indication the change in the specimen.

5. In a testing machine provided with a scale beam and movable poise, a rotatable drum movable in correlation with said poise, a rotatable rod suitably supported with respect to the specimen, means for making rotation of the rod dependent upon change of the specimen, means for rotating said rod which is variable as to speed of rotation, and suitable means actuated by said rod for indicating the rotation.

6. In a testing machine provided with a scale beam and movable poise a frame carried by the specimen to be tested, a drum carried by said frame, means for causing movement of the poise to move said drum, a rod suitably supported with respect to the specimen, means for rotating said rod, and an indicating wheel and scale common to said frame and said rod.

7. In a testing machine provided with a scale beam and movable poise a frame carried by the specimen to be tested, a drum carried by said frame adapted to be rotated by the movement of the poise on the scale beam, a rod, a universal joint connecting said rod with said frame, said rod being in threaded engagement with said joint, a weight suitably guided and connected with said rod for rotating the same and a second frame carried by the specimen to be tested and having a bearing for said rod, said weight being so arranged as to actuate said rod when said bearing is removed therefrom.

8. In a testing machine provided with a scale beam and movable poise a frame carried by the specimen to be tested, a drum carried by said frame adapted to be rotated by the movement of the poise on the scale beam, a rod, a universal joint connecting said rod with said frame, said rod being in threaded engagement with said joint, a weight suitably guided and connected with said rod for rotating the same, and a second frame, one side of which is weighted and a second rod having a bearing on each of said frames, said last mentioned rod acting as a fulcrum for said second mentioned frame.

9. In a device of the character described, frames for attachment to the specimen, a marking drum suitably supported, a marker for said drum, means for moving said marker, and a frictional device operated by movement of the specimen for controlling the operation of said moving means.

10. In a device of the character described, frames for attachment to the specimen, a record holding device suitably supported, a marker for said device, a normally stationary weight for effecting movement of said marker, a rotary device releasing said weight and frictional means for preventing the movement of said rotary means until freed by variation of the specimen.

11. In a device of the character described, frames for attachment to the specimen, a rod rotarily mounted in one of said frames and having frictional engagement with the other, a record holding device, a marker, and means whereby rotation of the rod results in movement of the marker.

12. In a device of the character described, pivoted frames adapted for attachment to the specimen, a record holding device, a gravity actuated marker normally stationary movable with movement of the frames upon their pivots, a rotary device between said frames having frictional engagement with one of them which varies according to the movement of the frames and connections between the marker and rotary device which then permit movement of the marker.

13. In a device of the character described, pivoted frames for attachment to the specimen, a record holding device, a gravity actuated marker normally stationary movable to produce a record, a rotary rod permitting movement of the marker by its rotation and frictional means released by variation of the specimen for controlling said rotation.

14. In a device of the character described, frames adapted for pivotal movement with respect to the specimen, means for attaching said frames to the specimen a record holding device suitably supported in proximity thereto, a marker adapted to produce a record, means for moving the marker and frictional means engaging said frames for controlling movement of the marker according to movement of the specimen.

15. In a device of the character described, frames adapted for attachment to the specimen, a rod having threaded engagement with one of said frames and frictional engagement with the other, a record drum, a marker normally stationary movable along said drum, and means forming a connection between the rod and marker for causing movement of the rod between the frames to permit movement of the marker.

16. In a device of the character described, frames adapted for attachment to the specimen and having pivotal movement with relation thereto, a rod having threaded engagement with one of said frames and frictional engagement with the other, normally stationary record producing mechanism, means tending to cause the operation of this mechanism and a connection whereby this operation is restrained until permitted by rotation of the rod.

17. In a device of the character described, frames for attachment to the specimen and to have pivotal movement with respect thereto, a marker, a rod rotarily mounted in one of said frames and frictionally engaged by the other and means including a connection between the rod and marker released by rotation of the rod to produce a record upon variation in this frictional engagement.

18. In a device of the character described, frames, means for attaching said frames to the specimen, a marker, a cord restraining movement of said marker, and means engaging said cord and lying between said frames for frictionally controlling movement of said cord with movement of said frames.

19. In a device of the character described, frames for attachment to the specimen, a rod between said frames retarded from movement by friction and released by movement of said frames, a record drum, a marker, means tending to cause said marker to move and a connection between the rod and marker permitting movement of said marker with movement of said rod.

20. In a device of the character described, frames, means for attaching said frames to the specimen to permit pivotal movement thereon, recording mechanism, and means for restricting movement of said recording mechanism, including a frictionally retarded connection between said frames, permitting movement of said marker with movement of said frames.

21. In a device of the character described, frames, means for mounting the frames upon the specimen to permit pivotal movement thereon, a rotatable rod between the frames frictionally retarded in rotation by pressure between said frames, a record drum, means for rotating the record drum, a marker for said drum, a connection between the marker and the rotatable rod, and means for causing rotation of the rod to advance the rod longitudinally with reference to one of said frames.

WILLIAM H. KENERSON.

Witnesses:
 OTIS E. RANDALL,
 WARREN A. CLOUGH.